March 18, 1969     F. M. SHARP     3,433,179
FREIGHT BRACING APPARATUS
Filed April 7, 1966     Sheet 1 of 2
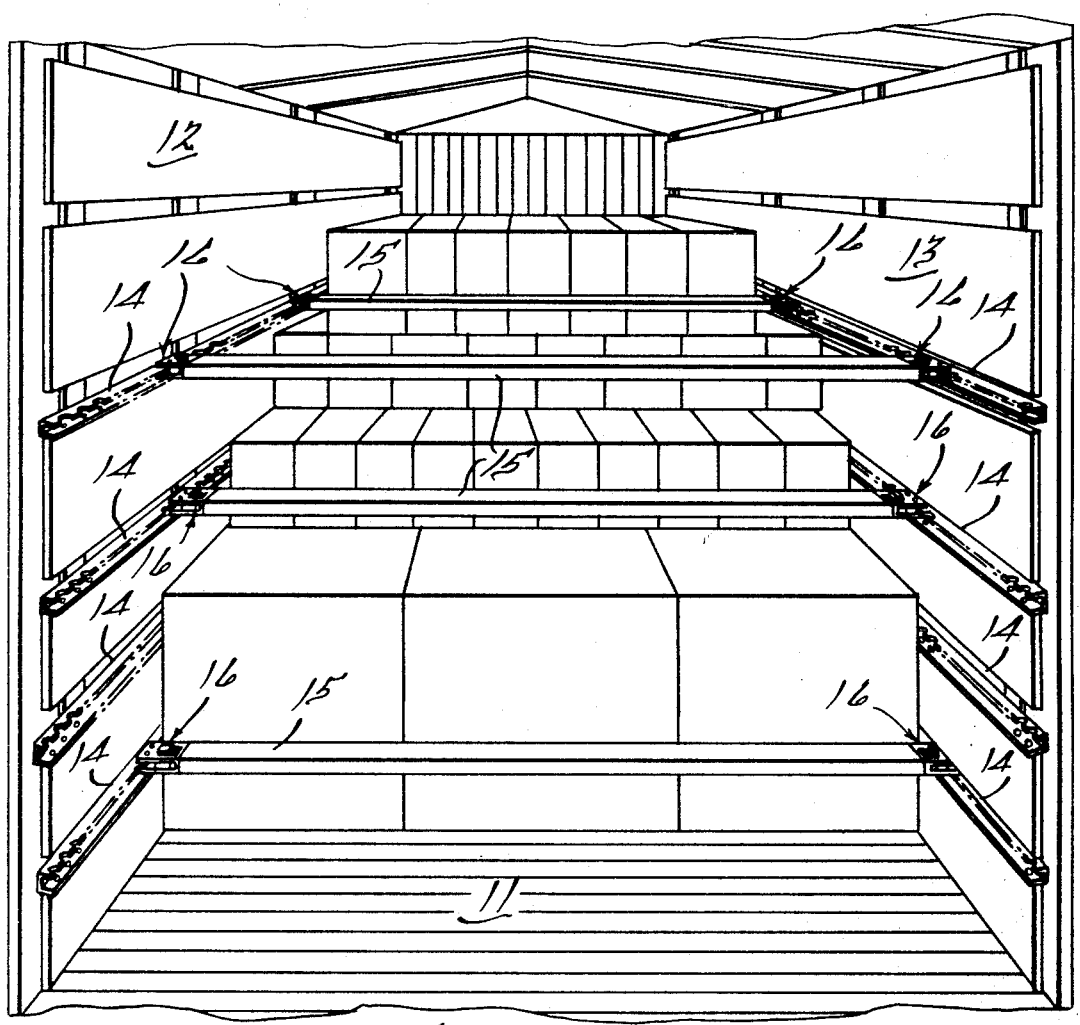
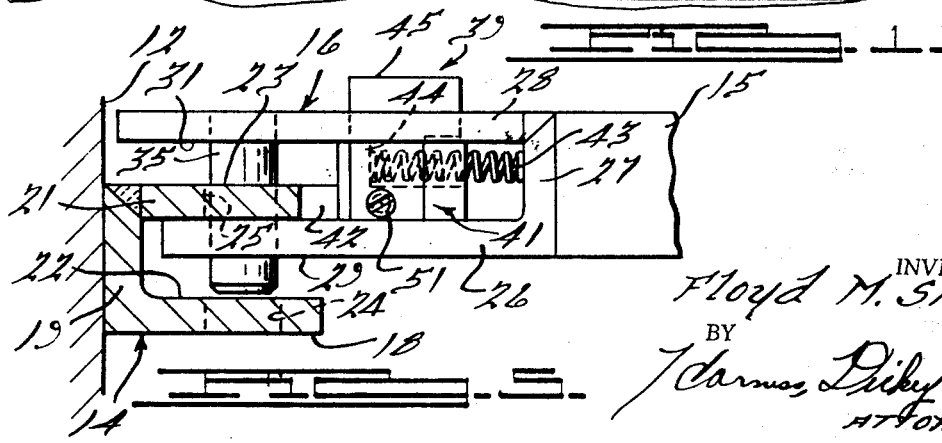
INVENTOR.
Floyd M. Sharp
BY
Carnes Dickey & Pierce
ATTORNEYS.

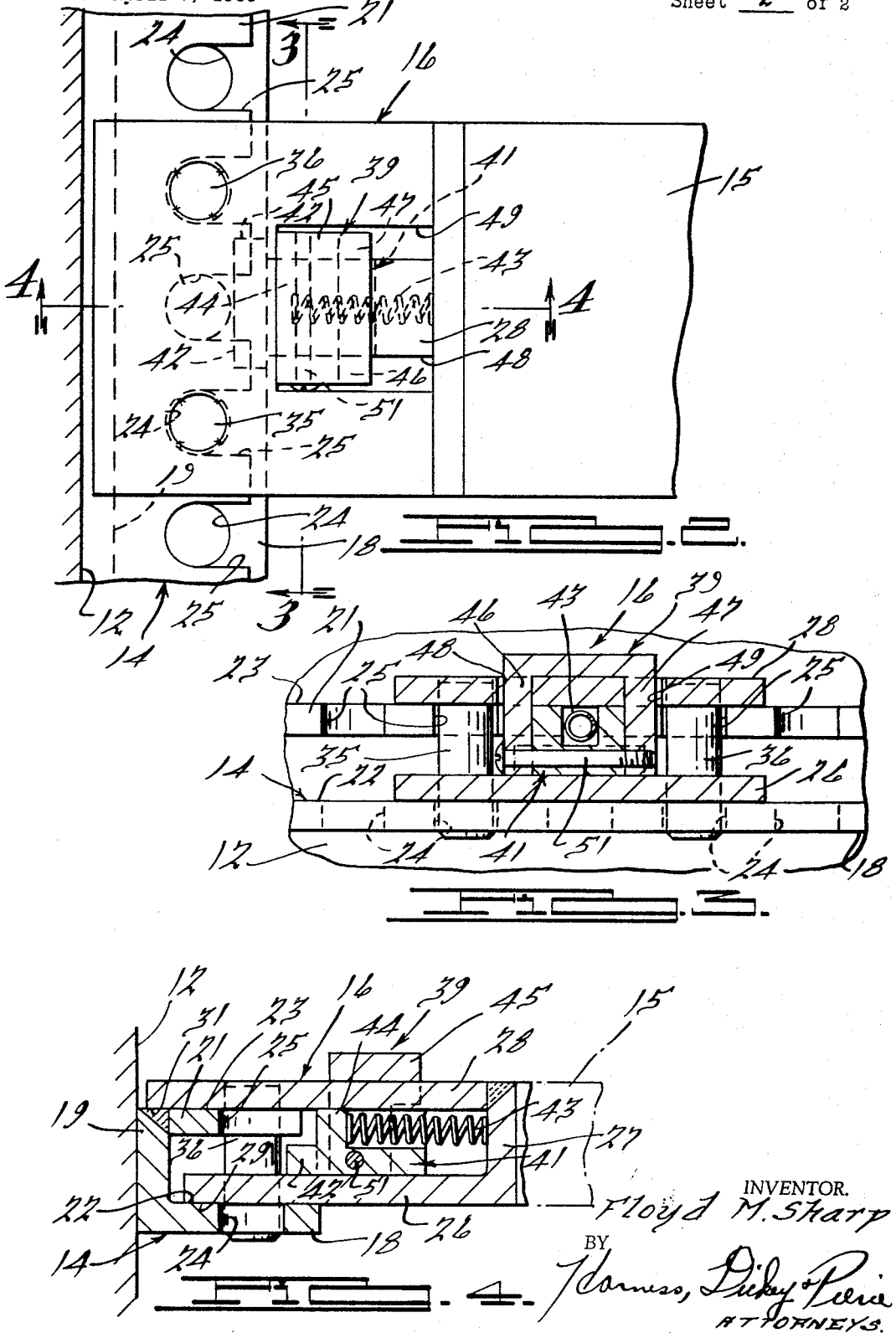

United States Patent Office 3,433,179
Patented Mar. 18, 1969

3,433,179
FREIGHT BRACING APPARATUS
Floyd M. Sharp, San Marino, Calif., assignor to Evans Products Company, a corporation of Delaware
Filed Apr. 7, 1966, Ser. No. 540,900
U.S. Cl. 105—369                 9 Claims
Int. Cl. B61d 45/00

ABSTRACT OF THE DISCLOSURE

A freight bracing system of the cross bar type embodying an improved end fitting construction for the cross bars and an improved belt rail arrangement that affords greater strength. The belt rail has a pair of outstanding legs, one of which is apertured, the other of which is slotted. The end fitting has first and second supporting means adapted to be supported on the belt rail legs, a fixed pin that is adapted to be received in the apertures and slots in the belt rail and a releasable lock for engaging the underside of one of the belt rail legs for precluding accidental disengagement.

---

This invention relates to a freight bracing device and more particularly to an improved end fitting construction for attaching a freight bracing device to a belt rail or the like.

It is well known to employ adjustable bracing devices for confining freight within cargo areas, particularly the cargo area of a freight transporting vehicle. The bracing device engages the freight and precludes its movement during transit. Such devices should be simple in construction and permit convenient adjustment so as to accommodate varying size loads. The shock loadings upon these bracing devices can be quite high in many instances, however.

It is, therefore, a principal object of this invention to provide an improved end fitting for adjustably attaching a freight bracing device within a cargo area.

It is a further object of this invention to provide an improved end fitting construction that is simple in operation and yet offers high resistance to damage under impact loading.

It is a still further object of this invention to provide an improved end fitting that is simple in construction and yet can carry high loads.

An end fitting construction embodying this invention is adapted to attach a freight bracing device to a belt rail or the like. The end fitting is particularly adapted for use in attaching the freight bracing device to a belt rail having two like facing supporting surfaces defined by a pair of spaced supporting parts. The end fitting has first supporting means adapted to be supportingly engaged with one of the belt rail supporting surfaces and second supporting means adapted to be supportingly engaged with the other belt rail supporting surface. First and second locking means of the end fitting coact with respective ones of the belt rail supporting parts for precluding movement of the end fitting in at least two different directions with respect to the belt rail.

Other objects and advantages of this invention will become more apparent as this description proceeds, particularly when considered in conjunction with the accompanying drawings, wherein:

FIGURE 1 is a perspective view showing the interior of a freight transporting vehicle embodying this invention;

FIGURE 2 is an enlarged top plan view showing the details of one of the end fittings in FIGURE 1;

FIGURE 3 is a cross sectional view taken along the line 3—3 of FIGURE 2;

FIGURE 4 is a cross sectional view taken along line 4—4 of FIGURE 2;

FIGURE 5 is a cross sectional view, in part similar to FIGURE 4, showing the end fitting prior to being attached to the belt rail.

Referring now in detail to the drawings, a railway car embodying this invention defines a cargo area 11 at least in part by means of spaced side walls 12 and 13. Affixed at varying heights and extending longitudinally along each of the side walls 12 and 13 are a plurality of belt rails or the like 14. The belt rails 14 provide means for attaching and supporting one or more freight bracing cross bars 15 having end fittings 16 that coact with the belt rails 14 in a manner which will become more apparent as this description proceeds.

The belt rails 14 have a generally channel shape made up of a structural angle having an outwardly extending leg 18 and an upstanding leg 19 that is affixed in any suitable manner to the respective car side wall. Welded to the upper end of the leg 19 and extending outwardly therefrom and parallel to the lower leg 18 is an upper leg 21. The lower and upper legs 18, 21 form like facing upper supporting surfaces 22 and 23. A plurality of longitudinally spaced circular apertures 24 are formed in the lower leg 18 and like spaced openings 25 are formed in the upper leg 21 above the openings 24. The openings 25 extend through the side of the upper leg 21 facing the cargo area 11 (FIG. 2).

The end fitting 16 also has a generally channel shape made up of an angle having a long leg 26 and an upstanding leg 27 that is affixed to the cross bar 15 in any suitable manner. An upper leg 28, that is slightly longer than lower leg 26, is welded to the upper end of the short leg 27 and extends parallel to the lower leg 26. The lower surfaces of the legs 26 and 28 define supporting surfaces 29 and 31, respectively, that are adapted to be supportingly engaged upon belt rail supporting surfaces 22 and 23, respectively. For this purpose, the spacing between the end fitting supporting surfaces 29 and 31 is equal to the spacing between the belt rail supporting surfaces 22 and 23.

A pair of pins 35 and 36 have their upper ends affixed in any suitable manner within apertures formed in the end fitting upper leg 28. The pins 35 and 36 extend through apertures in the lower leg 26 and have a portion depending beneath the lower surface of the lower leg 26. The depending portions of the pins 35 and 36 are adapted to be received in selected ones of the apertures 24 of the belt rail lower leg 18 and the upper ends of the pins 35, 36 extend into the openings 25 of the upper belt rail leg 21. The distance between the lower ends of the pins 35 and 36 and the upper surface of the end fitting leg 26 is less than the gap that exists between the belt rail legs 18 and 21 so that the end fitting 16 may be raised and slid in place (FIG. 5) upon the belt rail 14. The pins 35 and 36 then can be dropped into the respective holes in the belt rail leg 18 to fix the end fitting 16 relative to the belt rail 14. It will be noted from FIGURES 2 and 3 that the spacing between the centers of the pins 35 and 36 is the same as the spacing between three of the respective openings in the belt rail legs. This permits a finer adjustment of the cross bar 15 with respect to the belt rail 14.

The coaction of the pins 35 and 36 with the apertures 24 and openings 25 precludes lateral movement of the end fitting along the length of the cargo area 11. In addition, the coaction of the lower pin ends with the openings 24 in the belt rail lower leg 18 precludes any axial movement of the end fitting 16 with respect to the belt rail 14. Since both upper and lower legs 28 and 26 of the end fitting 16 are supported upon the upper and lower legs 21 and 18 of the belt rail 14, considerable strength is provided for the end fitting. This extends any shock loading over a relatively wide area and reduces the possibility of damage to the end fitting 16.

To preclude the end fitting 16 from being accidently dislodged from the belt rail 14 by vertical forces, a latch mechanism, indicated generally by the reference numeral 39, is provided. The latch mechanism 39 is comprised of a locking member 41 that is contained between the end fitting legs 26 and 28 and has an elongated end 42 that is adapted to underlie the upper belt rail leg 21 and extend beyond the ends of one of its openings 25. A coil compression spring 43 engages the end fitting upstanding leg 27 and an upstanding leg 44 of the locking member 41 to urge the latch mechanism 39 to its engaged position. In this position, the end 42 precludes the end fitting 16 from being removed from the belt rail 14. A release handle in the form of a channel shaped member 45 has depending legs 46 and 47 that extend through elongated slots 48 and 49 formed in the upper end fitting leg 28. The lower ends of the legs 46 and 47 are fixed to the locking member 41 by means of a bolt 51 that extends through the legs 46 and 47 and through the locking member 41.

When the end fitting 16 is being assembled onto the belt rail 14 (FIG. 5), the belt rail upper leg 21 will engage the locking member end 42 and compress the coil spring 43 so that the parts may be moved into their operative relationship with the lower ends of the pins 35 and 36 being aligned with the respective lower leg apertures 24. When the end fitting 16 is dropped so that the pins 35 and 36 enter the apertures 24, pressure of the leg 21 on the locking member 41 will be removed and the coil spring 43 will urge it to its engaged position (FIG. 4).

The end fitting 16 can be removed from the belt rail 14 by sliding the locking member 41 so that its part 42 will clear the upper belt rail leg 21. The end fitting 16 is then raised and slid from position. It should be understood that one of the end fittings 16 is preferably telescopic with respect to the cross bar 15 to facilitate insertion at the belt rail 14. It should also be readily apparent that the end fitting construction readily lends itself to one-man operation, that is, only one man can locate the cross bars 15 and lock them in place since the latch mechanism 39 automatically engages. Also, this invention is not limited to the exact construction shown and described, but that various changes and modifications may be made without departing from the spirit and scope of the invention. For example the end fitting construction described may be used with various types of freight bracing apparatus and its use is not limited to railway cars as described. It may be used in other types of freight transporting vehicles or for confining goods within other cargo confining areas.

What is claimed is:

1. In combination, a belt rail having first and second outstanding legs defining respective first and second like facing supporting surfaces, said first leg being formed with a plurality of longitudinally spaced openings, and an end fitting for attaching a freight bracing device to said belt rail, said end fitting having first supporting means supportingly engaged with said first supporting surface of said belt rail, second supporting means supportingly engaged with said second supporting surface of said belt rail, first locking means comprising at least one pin affixed to said first end fitting supporting means and extending into a selected one of the openings in said first belt rail leg for precluding movement of said end fitting in one direction with respect to said belt rail, and second locking means coacting with said second belt rail leg for precluding movement of said end fitting in another direction with respect to said belt rail.

2. The combination as set forth in claim 1 wherein the second locking means precludes movement of said end fitting in a normal direction with respect to the one direction.

3. The combination as set forth in claim 1 wherein the first locking means coacts with both the belt rail supporting legs for precluding movement of said end fitting in the one direction.

4. The combination as set forth in claim 1 wherein the first locking means is fixed relative to said end fitting and the second locking means is selectively releasable upon movement relative to said end fitting.

5. The combination as set forth in claim 1 wherein there are two pins affixed to the first end fitting supporting means.

6. The combination as set forth in claim 5 wherein the spacing between the two pins is greater than the spacing between an adjacent pair of openings in the first belt rail leg.

7. The combination as set forth in claim 1 wherein longitudinally aligned openings are formed in each of the belt rail legs and the pin coacts with respective openings in each leg.

8. The combination as set forth in claim 1 wherein the second belt rail leg lies above the first belt rail leg, said pin means depending from said first end fitting supporting means with the distance between the lower end of said pin means and the upper surface of said first supporting means being less than the gap between the belt rail legs for insertion of said pin means and said first supporting means into the gap, said second locking means comprising releasable latch means, said releasable latch means being extendable into said gap upon assembly.

9. The combination as set forth in claim 8 wherein there are longitudinally spaced openings in the second leg of the belt rail aligned with the openings in the first leg, the openings in the second leg opening through one side thereof, and the pin means are affixed to and extend between each of said end fitting supporting means.

References Cited

UNITED STATES PATENTS

| | | |
|---|---|---|
| 1,597,091 | 8/1926 | McMahan. |
| 2,769,404 | 11/1956 | Dietrichson. |
| 2,894,462 | 7/1959 | Newcomer et al. |
| 2,982,230 | 5/1961 | Chapman. |
| 3,009,426 | 11/1961 | Nampa. |

DRAYTON E. HOFFMEN, *Primary Examiner.*